(12) United States Patent
Harada

(10) Patent No.: US 6,188,978 B1
(45) Date of Patent: Feb. 13, 2001

(54) VOICE ENCODING/DECODING APPARATUS COPING WITH MODEM SIGNAL

(75) Inventor: Ryoichi Harada, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/221,824

(22) Filed: Dec. 28, 1998

(30) Foreign Application Priority Data

Jan. 13, 1998 (JP) .................................................. 2-018041

(51) Int. Cl.⁷ .................................................. G10L 11/00
(52) U.S. Cl. ........................ 704/201; 704/202; 704/226
(58) Field of Search .................................. 704/200, 219, 704/201, 215, 223, 217, 202, 226, 227, 228, 500, 503

(56) References Cited

U.S. PATENT DOCUMENTS

| | | | |
|---|---|---|---|
| 4,815,137 | * 3/1989 | Benvenuto | 704/234 |
| 5,550,543 | * 8/1996 | Chen et al. | 341/94 |
| 5,615,297 | * 3/1997 | Davis | 704/201 |
| 5,970,444 | * 10/1999 | Hayashi et al. | 704/223 |
| 5,999,898 | * 12/1999 | Richter | 704/217 |
| 6,038,529 | * 3/2000 | Harada | 704/215 |
| 6,073,092 | * 6/2000 | Kwon | 704/219 |

FOREIGN PATENT DOCUMENTS

| | | | |
|---|---|---|---|
| 63-001238 | 1/1988 | (EP) . | |
| 0 764 940 A2 | 3/1997 | (EP) . | |
| 62-8631 | 1/1987 | (JP) | H04J/3/17 |
| 63-1238 | 1/1988 | (JP) | H04M/7/00 |
| 63-26044 | 2/1988 | (JP) . | |
| 63-141423 | 6/1988 | (JP) . | |
| 63-237624 | 10/1988 | (JP) | H04J/3/00 |
| 63-285059 | 11/1988 | (JP) | H04M/11/06 |
| 1-147933 | 6/1989 | (JP) | H04B/14/04 |
| 2-246535 | 10/1990 | (JP) . | |
| 4-111634 | 4/1992 | (JP) | H04B/14/04 |
| 5-37674 | 2/1993 | (JP) | H04B/14/04 |
| 5-122414 | 5/1993 | (JP) . | |
| 7-501191 | 2/1995 | (JP) | H04J/3/14 |
| 7-143076 | 6/1995 | (JP) | H04B/14/04 |
| 7-212320 | 8/1995 | (JP) | H04B/14/04 |
| 8-32765 | 2/1996 | (JP) . | |
| 8-265457 | 11/1996 | (JP) | H04M/11/06 |
| 9-321777 | 12/1997 | (JP) | H04L/12/26 |

OTHER PUBLICATIONS

ISCAS '89 IEEE. Shimokoshi et al., "A study of voice/non–voice discrimination method using neural networks for integrated packet switching". pp. 2096–2099.*

European Search Report of European Patent Office dated Apr. 20, 1999.

K. Shimokoshi et al. "A study of voice/non–voice method using neural networks fo integrated packet switching system", Proceeding of the international symposium on circuits and systems, Portland, May 8–11, 1989, vol. 3of 3, pp 2096–99.

S. Dimolitsas, "Characterization of low–rate digital voice coder performance with non–voice signals", Speech communication, vol. 12, No. 2, Jun. 1, 1993, pp135–144.

* cited by examiner

*Primary Examiner*—Richemond Dorvil
(74) *Attorney, Agent, or Firm*—McGuireWoods LLP

(57) ABSTRACT

A voice encoding/decoding apparatus includes a voice encoding unit and a voice decoding unit. In the voice encoding unit, a non-voice signal detector detects whether an input signal is a voice signal or a non-voice signal and outputs a signal identification signal on the basis of the detection result. When the non-voice signal detector detects a voice signal, a voice encoder encodes the input signal as the voice signal and transmits encoded data to the voice decoding unit. When the non-voice signal detector detects a non-voice signal, the voice encoding unit transmits the input signal to the voice decoding unit as non-encoded transmission data. The voice decoding unit includes a voice decoder and a first switch. When the non-voice signal detector detects the voice signal, the voice decoder decodes the encoded data transmitted from the voice encoder and outputs the decoded voice signal. The first switch selects, on the basis of the signal identification signal output from the non-voice signal detector, the decoded voice signal or the non-encoded transmission data.

14 Claims, 4 Drawing Sheets

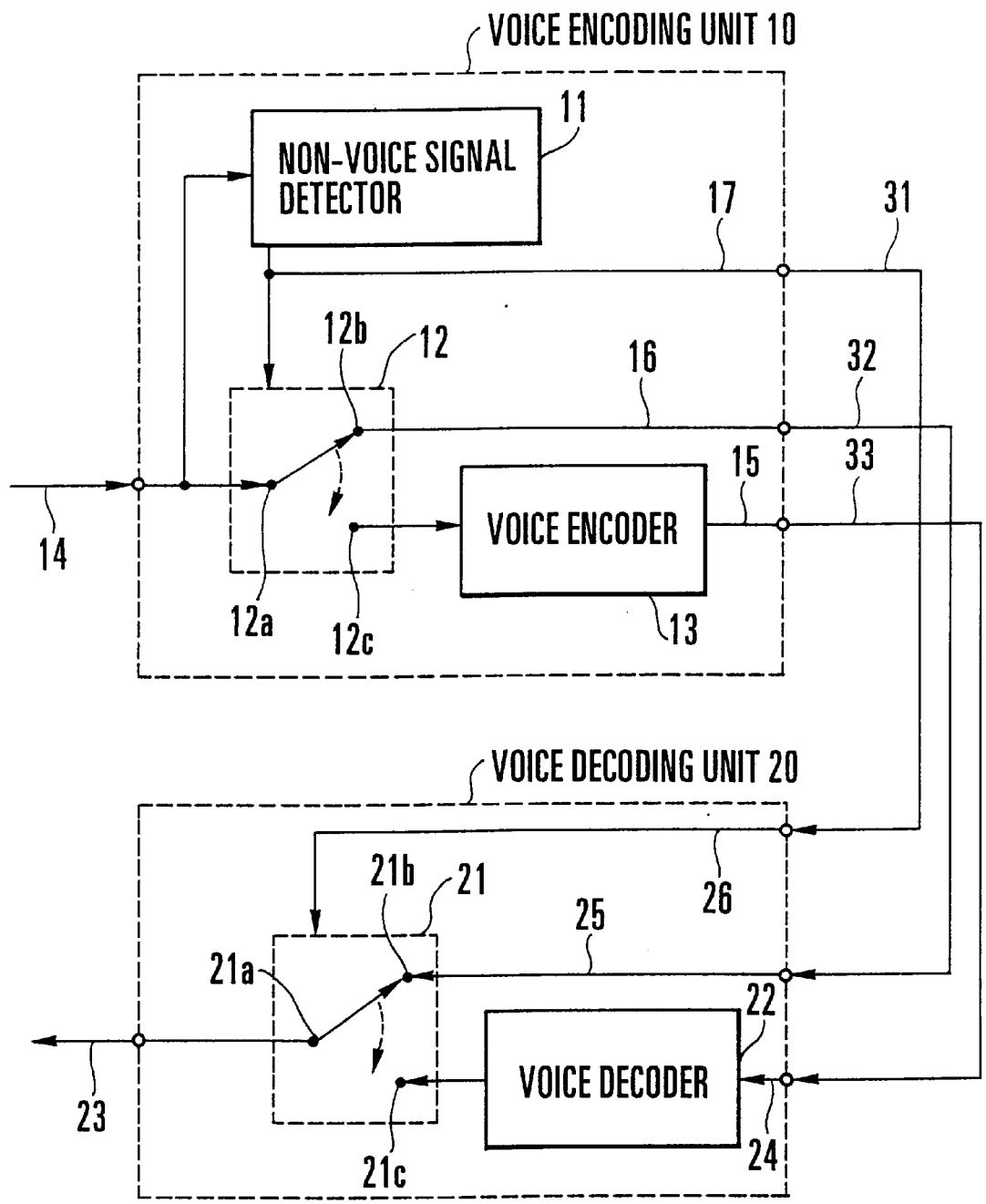
F I G. 1

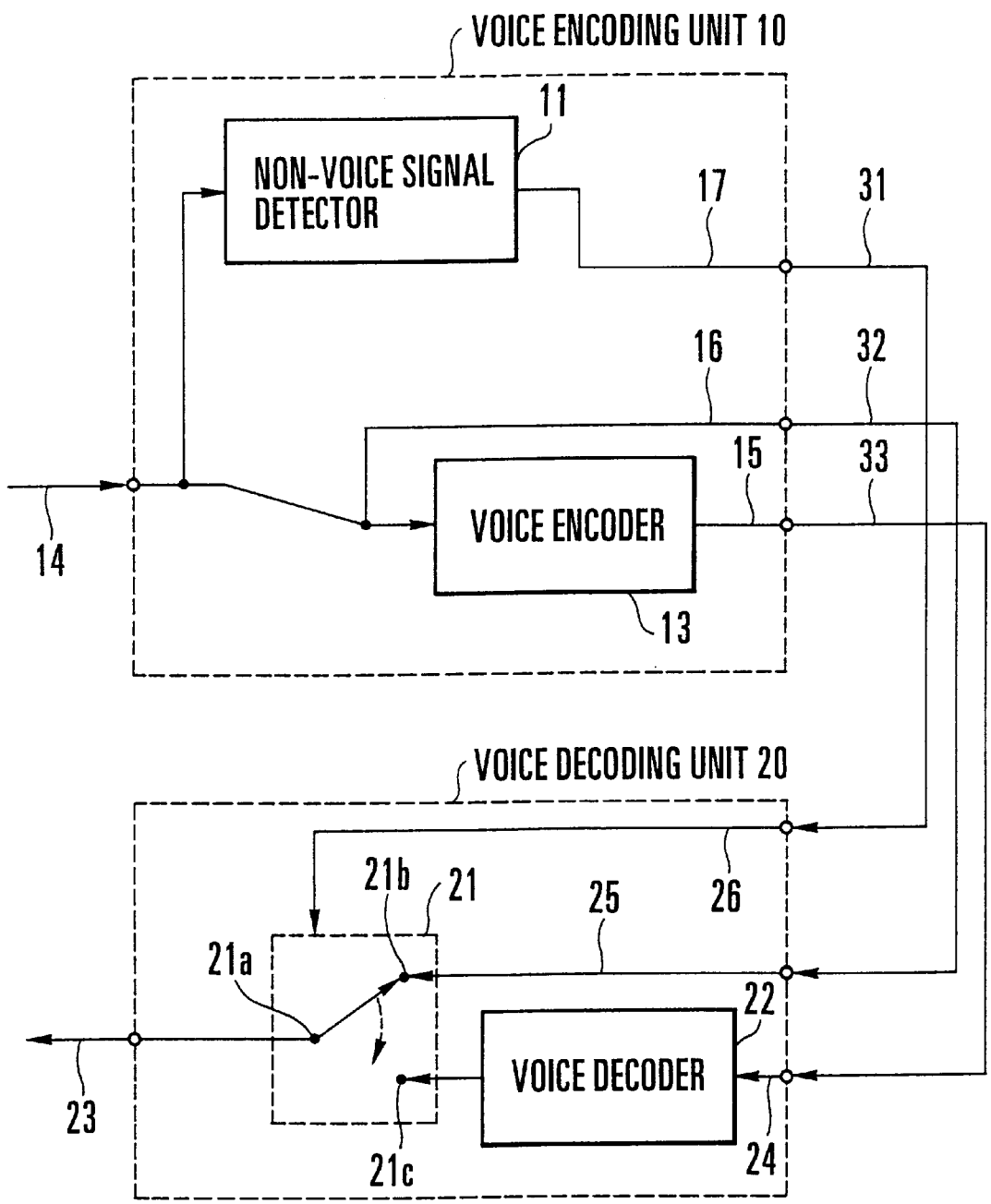
F I G. 2

VOICE ENCODING/DECODING APPARATUS COPING WITH MODEM SIGNAL

BACKGROUND OF THE INVENTION

The present invention relates to a voice encoding/decoding apparatus coping with a modem signal and, more particularly, to a voice encoding/decoding apparatus which encodes an input signal as a voice signal using a voice encoding means, decodes the signal using a voice decoding means, and outputs it, or directly transmits an input signal as a non-voice signal through the voice encoding and decoding means.

In a conventional voice encoding/decoding apparatus aiming at transmission of not only voice signals but also non-voice signals, when an input non-voice signal is detected on the encoding side, the non-voice signal is temporarily decoded using a demodulator corresponding to the modulation scheme. -The decoded data is transmitted in place of encoded voice data. On the decoding side, the transmitted decoded data is not decoded using a voice decoder but modulated using a modulator corresponding to the modulated signal input to the encoding input side, thereby transmitting the non-voice signal.

As such a conventional voice encoding/decoding apparatus, a technique of controlling switching between a non-voice signal and a voice signal using an identification signal while cascade-connecting demodulators has been proposed.

Japanese Patent Laid-Open No. 5-122414 discloses a voice encoding/decoding apparatus for ON/OFF-controlling modulators/demodulators by detecting a G3 facsimile signal as a non-voice signal. Japanese Patent Laid-Open No. 2-246535 discloses a voice information transmission method of transmitting a PB (Push Button) signal by a unique scheme using a determination bit.

In the prior arts, however, since a non-voice signal is temporarily decoded to transmit data, the voice encoding unit must have modulators/demodulators equal in number to non-voice signal modulation/demodulation schemes.

In addition, since data obtained by demodulating a non-voice signal is transmitted in place of a voice signal to a line with the same transfer rate as that for a voice signal, the data transfer rate is limited to a rate lower than that transfer rate of the voice encoding/decoding apparatus.

Japanese Patent Laid-Open No. 63-26044 discloses a voice encoding apparatus for compressing voice information and transmitting a modem signal like a voice signal.

Japanese Patent Laid-Open No. 63-141423 discloses a voice encoding/decoding apparatus having, on the transmission side, two encoders for encoding a voice signal and a modem signal, respectively, and a means for transmitting a signal representing the type of signal to be transmitted to the reception side, and on the reception side, two decoders for decoding an encoded voice signal and an encoded modem signal, respectively. This encoding/decoding apparatus selects a decoder in accordance with the type of encoded signal from the transmission side.

Japanese Patent Laid-Open No. 7-143076 discloses an encoding/decoding apparatus which uses, on the encoding side, a voice signal code book when an input signal is a voice signal, and a modem signal code book when an input signal is a modem signal, and on the decoding side, determines the received signal added with information identification and decodes the data using the voice signal code book when the input encoded data is voice signal encoded data, and using the modem signal code book when the input encoded data is modem signal encoded data.

However, in the above-described prior art as well, no solutions to the requirement of modulators/demodulators equal in number to corresponding modulation/demodulation schemes are disclosed. Additionally, any means of increasing the data transfer rate according to the improvement of voice encoding/decoding scheme are not disclosed, either.

Modulation/demodulation schemes of many types are put into practice and widely used, and the conventional apparatuses must have all modulators/demodulators corresponding to these schemes.

When specification expansion unique to a modulator/demodulator is done by the unit developer, it is impossible to cope with a signal which can be determined as a non-voice signal as far as the use expansion is unique to the developer or maker of the unit.

In a line connected for data transmission, which not assumed by the modulator/demodulator, processing of temporarily demodulating and then modulating data is performed midway. This processing causes a delay to degrade the line quality.

To demodulate and transmit a non-voice signal, the same line as that used to encode and transmit a voice signal is used. For this reason, the non-voice signal transfer rate must be lower than the voice signal transfer rate. In association with this point, along with the recent progress in research and development, voice encoding schemes using lower bit rates are being developed.

On the other hand, modulation/demodulation schemes are being developed to increase transfer rates. In the prior arts, however, a modulated/demodulated signal must also be transmitted using a line for a voice encoding/decoding scheme using a low bit rate. For this reason, the line quality for the modulator/demodulator is apparently low, and transmission is performed at a transfer rate lower than that of the line for the voice encoding/decoding scheme.

In addition. in a high-efficiency voice encoding scheme, an encoded voice signal may degrade due to not only the characteristics of an input voice signal and the S/N ratio but also background noise contained in the input voice signal.

SUMMARY OF THE INVENTION

It is an object of the present invention to provide a voice encoding/decoding apparatus capable of transmitting any non-voice signals modulated by modulation/demodulation schemes assuming a telephone band at a high speed.

It is another object of the present invention to provide a voice encoding/decoding apparatus which need not have modulators/demodulators equal in number to corresponding modulation/demodulation schemes and can simplify the circuit and apparatus arrangements and realize size and weight reduction and low power consumption.

In order to achieve the above objects, according to the present invention, there is provided a voice encoding/decoding apparatus comprising a voice encoding unit for encoding a voice signal and a voice decoding unit for decoding the encoded voice signal transmitted from the voice encoding unit, the voice encoding unit comprising signal detection means for detecting whether an input signal is a voice signal or a non-voice signal and outputting a signal identification signal on the basis of the detection result, and voice encoding means for, when the signal detection means detects a voice signal, encoding the input signal as the voice signal and transmitting encoded data to the voice decoding unit, wherein when the signal detection means detects a non-voice signal, the voice encoding unit transmits the input signal to the voice decoding unit as non-encoded transmission data, and the voice decoding unit comprising voice decoding means for, when the signal detection means detects the voice signal, decoding the encoded data transmitted from the voice encoding means and outputting the decoded voice signal, and first switching means for selecting, on the basis of the signal identification signal output from the signal detection means, one of the decoded voice signal output from the voice decoding means and the non-encoded transmission data transmitted from the voice encoding unit.

BRIEF DESCRIPTION OF THE DRAWINGS

FIG. 1 is a block diagram of a voice encoding/decoding apparatus according to the first embodiment of the present invention;

FIG. 2 is a block diagram showing a modification of the first embodiment shown in FIG. 1;

DESCRIPTION OF THE PREFERRED EMBODIMENTS

Figure 3:
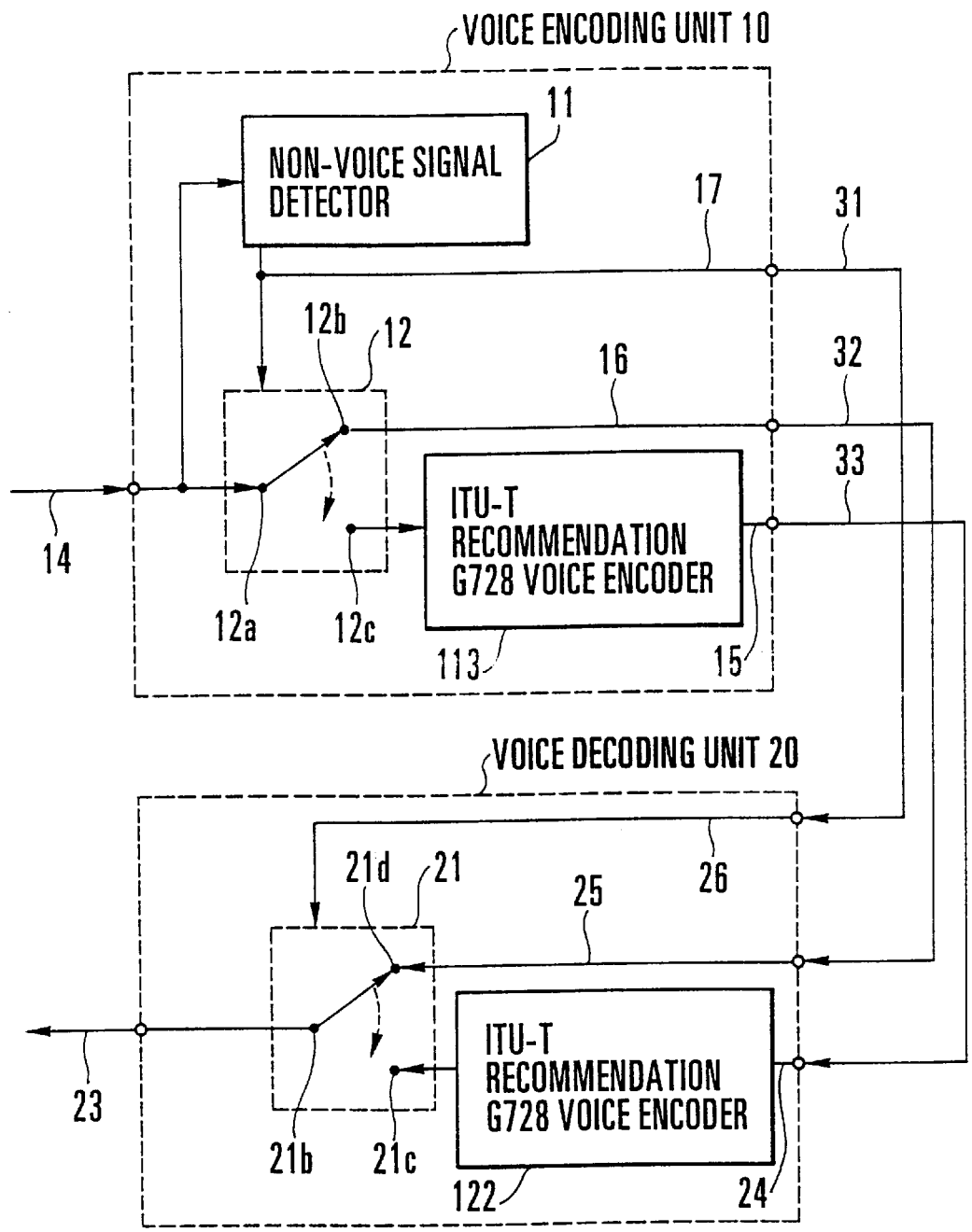
FIG. 3 is a block diagram showing a voice encoding/decoding apparatus coping with a modem signal according to the second embodiment of the present invention.

The present invention will be described below with reference to the accompanying drawings.

FIG. 1 shows a voice encoding/decoding apparatus according to the first embodiment of the present invention. The arrangement of a voice encoding unit 10 will be described first with reference to FIG. 1. The voice encoding unit 10 comprises a non-voice signal detector 11, a first switch 12, and a voice encoder 13.

An input signal 14 is input to the non-voice signal detector 11 and a movable terminal 12a side of the first switch 12. The first switch 12 and a second switch 21 to be described later represent mechanical switches for the description convenience. Actually, non-contact type switches to be electronically opened/closed are used.

The non-voice signal detector 11 detects whether the input signal 14 is a voice signal or a non-voice signal. Upon detecting a non-voice signal, the non-voice signal detector 11 outputs to the first switch 12 a line selection signal 17 for connecting the movable terminal 12a of the first switch 12 to a fixed terminal 12b side and also transmits the line selection signal 17 to a voice decoding unit 20 through a line 31.

When the movable terminal 12a of the first switch 12 is connected to the fixed terminal 12b side, the input signal 14 as a non-voice signal is transmitted from the voice encoding unit 10 to the voice decoding unit 20 side through a line 32 as transmission data 16 at a transfer rate in the telephone band without being encoded.

On the other hand, upon detecting that the input signal 14 is a voice signal, the non-voice signal detector 11 outputs the line selection signal 17 to the first switch 12 to switch the movable terminal 12a from the fixed terminal 12b side to a fixed terminal 12c side, as indicated by a broken line. As a result, the input signal 14 as a voice signal is input to the voice encoder 13 through the first switch 12.

The voice encoder 13 encodes the voice signal from the first switch 12 and outputs it as output transmission data 15 at a transfer rate lower than that in the telephone band. This output transmission data 15 is transmitted to the voice decoding unit 20 through a line 33.

The arrangement of the voice decoding unit 20 will be described next. A line selection signal 26 (line selection signal 17) transmitted from the voice encoding unit 10 side through the line 31 is supplied to the second switch 21. This line selection signal 26 represents that the transmission data from the voice encoding unit 10 is input transmission data 25 (output transmission data 16) at a transfer rate in the telephone band, which is transmitted through the line 32, or encoded input transmission data 24 at a transfer rate lower than that in the telephone band, which is transmitted through the line 33.

If the line selection signal 26 represents the input transmission data 25 at a transfer rate in the telephone band, a movable terminal 21a of the second switch 21 is connected to a fixed terminal 21b side. In this case, the input transmission data 24 at a transfer rate lower than that in the telephone band, which is transmitted from the voice encoding unit 10, is input to a voice decoder 22 and decoded. The decoded voice signal output from the voice decoder 22 is output through a fixed terminal 21c and movable terminal 21a of the second switch 21.

When the line selection signal 26 represents the input transmission data 24 at a transfer rate lower than that in the telephone band, the movable terminal 21a of the second switch 21 is connected to the fixed terminal 21c side. In this case, the input transmission data 25 at a transfer rate in the telephone band, which is transmitted from the voice encoding unit 10, is output through the fixed terminal 21b and movable terminal 21a of the second switch 21.

As described above, depending on whether the movable terminal 21a of the second switch 21 which is controlled and switched by the line selection signal 26 is connected to the fixed terminal 21b or 21c side, an output signal 23 output from the movable terminal 21a changes.

More specifically, when the movable terminal 21a of the second switch 21 is connected to the fixed terminal 21b side by the line selection signal 26, the input transmission data 25 is directly output through the second switch 21 as the output signal 23. When the movable terminal 21a of the second switch 21 is connected to the fixed terminal 21c side, the voice signal decoded by the voice decoder 22 is output through the second switch 21 as the output signal 23.

The operation of the voice encoding/decoding apparatus having the above arrangement will be described next.

The operation on the voice encoding unit 10 side will be described first. In the voice encoding unit 10, the non-voice signal detector 11 has a function of detecting the difference between a voice signal and a modulated data signal. The input signal 14 is supplied to the input terminal of the non-voice signal detector 11 and the movable terminal 12a of the first switch 12. Whether the input signal 14 input to the non-voice signal detector 11 is a voice signal or a non-voice signal is detected on the basis of a specific characteristic feature of the input signal 14.

Upon detecting a voice signal as the input signal 14, the non-voice signal detector 11 supplies the line selection signal 17 corresponding to the detection result to the first switch 12. Simultaneously, the non-voice signal detector 11 supplies the line selection signal 26 to the second switch 21 in the voice decoding unit 20 through the line 31.

In the voice encoding unit 10, when the line selection signal 17 is supplied from the non-voice signal detector 11 to the first switch 12, the movable terminal 12a is switched to the fixed terminal 12c side. In this case, the voice signal (input signal 14) is input to the voice encoder 13 from the movable terminal 12a of the first switch 12 through the fixed terminal 12c. The voice encoder 13 multiplexes the voice signal into a predetermined frame format and outputs it as the output transmission data 15. The output transmission data 15 is input to the voice decoder 22 in the voice decoding unit 20 through the line 33 as the input transmission data 24.

On the voice decoding unit 20 side, since the line selection signal 26 representing that the input signal 14 is a voice signal is supplied to the second switch 21, the movable terminal 21a has been switched to the fixed terminal 21c side. The fixed terminal 21c is connected to the output terminal of the voice decoder 22. The input transmission data 24 as the encoded voice signal transmitted from the voice encoder 13 is input to the voice decoder 22 through the line 33. The voice decoder 22 decodes the encoded voice signal and outputs the voice signal through the second switch 21 as the output signal 23 as a voice signal.

On the other hand, when a non-voice signal (input signal 14) is input to the voice encoding unit 10, the non-voice signal is detected by the non-voice signal detector 11, and the line selection signal 17 corresponding to the detection result is supplied to the first switch 12. At this time, the movable terminal 12a is switched from the movable terminal 12a side to the fixed terminal 12b side. The input non-voice signal is output through the movable terminal 12a and fixed terminal 12b of the first switch 12 as the output transmission data 16 and supplied to the second switch 21 in the voice decoding unit 20 through the line 32 as the the input transmission data 25.

At the same time, the line selection signal 17 representing a non-voice signal and output from the non-voice signal detector 11 is supplied to the voice decoding unit 20 through the line 31 as the line selection signal 26.

When the line selection signal 26 is supplied to the second switch 21, the movable terminal 21a is switched from the movable terminal 21a side to the fixed terminal 21b side, as indicated by a broken line. In this case, the output transmission data 16 of the non-voice signal transmitted through the line 32 is input to the voice decoding unit 20 as the input transmission data 25. The input transmission data 25 is output through the fixed terminal 21b and movable terminal 21a of the second switch 21 as the output signal 23.

The operation of detecting the difference between a voice signal and a non-voice signal such as a modulated signal for data transmission in the non-voice signal detector 11 can be realized by analyzing the frequency distribution of the input signal and measuring the power of a specific frequency. This detection can also be realized by identifying the difference between a voice signal associated with the power distribution of the frequency band of the input signal and a modulated data communication signal using, e.g., a neurocomputer which learns the difference.

Encoding of the voice signal by the voice encoder 13 can be realized by a voice encoding scheme recommended and standardized by ITU-T (International Telecommunication Union-Telecommunication sector), i.e., a low bit rate voice encoding scheme such as ITU-T recommendation G.728 LD-CELP 16-kb/s voice encoding or ITU-T recommendation G.729 CS-ACELP 8-kb/s voice encoding.

In the first embodiment shown in FIG. 1, in the voice encoding unit 10, the line selection signal 17 and one of the two output transmission data 15 and 16 having different transfer rates are transmitted to the voice decoding unit 20 through the lines 32 and 33, respectively, as described above.

The output transmission data having different transfer rates according to the input signal 14 and the line selection signal 17 can also be multiplexed by the voice encoder 13 into a predetermined unique frame format and transmitted. In the entire voice encoding/decoding apparatus constructed by combining a plurality of voice encoding/decoding units coping with modem signals, an output signal in a predetermined unique frame format may be transmitted through one output line at a specific transfer rate in the entire voice encoding unit 10 using the fact that a predetermined transfer rate is obtained statistically.

It can hardly be assumed that voice signals and non-voice signals are frequently switched. For example, in line quality (quality of service (QOS)) setting in the ATM (Asynchronous Transfer Mode) transmission scheme, when it is determined that the input signal is switched upon detecting a voice signal or a non-voice signal, call connection may be performed to require a specific transfer rate as one of factors to be selected for line quality setting in call connection.

Alternatively, output transmission data may be transmitted at two transfer rates corresponding to a non-compressed voice signal and a compressed voice signal.

In the voice decoding unit 20, the line selection signal 26 and the input transmission data 25 and 24 are subjected to inverse processing corresponding to processing in the voice encoding unit 10. More specifically, when the line selection signal 17 and the transmission data 16 and 15 are multiplexed into a unique frame format on the voice encoding unit 10 side and transmitted, the line selection signal 26 and the input transmission data 25 and 24 must be extracted on the voice decoding unit 20 side by an inverse procedure.

The voice decoder 22 must also perform decoding using a scheme corresponding to the voice encoder 13.

As described above, according to the first embodiment, a modulated signal determined as a non-voice signal can be directly transmitted through a 64-kbits/s line without modulation. For this reason, this apparatus can be applied to signals of all modulation/demodulation schemes which can be determined as non-voice signals.

In addition, an arrangement without the first switch 12 in the voice encoding unit 10 can also be used. More specifically, as shown in FIG. 2, the input signal 14 is always supplied to the line 32 for transmitting the output transmission data 16 and the input terminal of the voice encoder 13. Upon detecting the input signal 14 as a voice signal or a non-voice signal, the non-voice signal detector 11 outputs the line selection signal 17 to the voice decoding unit 20 through the line 31 in accordance with the detection result.

In this arrangement, when the non-voice signal detector 11 detects that the input signal 14 is a non-voice signal, the line selection signal 17 is output to the switch 21 through the line 31 to select the line 32 for transmitting the non-voice signal as the output transmission data 16. With this processing, the non-voice signal as the input signal 14 is directly output as the output transmission data 16 and input to the voice decoding unit 20 through the line 32 as the input transmission data 25, selected by the switch 21, and output as the output signal 23.

On the other hand, upon detecting that the input signal 14 is a voice signal, the non-voice signal detector 11 outputs the line selection signal 17 to the switch 21 through the line 31 to select the line 33 for transmitting the voice signal as the output transmission data 15. At this time, the input signal 14 is encoded by the voice encoder 13 and then output to the line 33 as the output transmission data 15. The output transmission data 15 is decoded by the voice decoder 22 in the voice decoding unit 20 as the input transmission data 24, selected by the switch 21, and output as the output signal 23.

FIG. 3 shows a voice encoding/decoding apparatus according to the second embodiment of the present invention. The same reference numerals as in FIG. 1 denote the same parts in FIG. 3, and a detailed description thereof will be omitted.

The arrangement of a voice encoding unit 10 will be described first. When an input signal 14 is input, a non-voice signal detector 11 detects the difference between a voice signal and a modulated data signal. A fixed terminal 12c of a first switch 12 is connected to the input terminal of a voice encoder 113. When the input signal 14 is a voice signal, the voice encoder 113 performs voice encoding by the ITU-TG.728 voice encoding scheme.

The encoded voice signal encoded by the voice encoder 113 is output to a line 33 as output transmission data 15 and input to a voice decoder 122 in a voice decoding unit 20 as input transmission data 24.

The operation of the apparatus of the second embodiment will be described next. In this embodiment, the ITU-T recommendation G.728 scheme is realized by the voice encoder 113.

Output transmission data 16 is transmitted at 64 kbits/s in the telephone band. However, in the ITU-T recommendation G.728 scheme, encoded data is transmitted at 16 kbits/s, the line 33 through which the output transmission data 15 is transmitted has a transfer rate of 16 kbits/s.

When the non-voice signal detector 11 detects that the input signal 14 is a non-voice signal, a movable terminal 12a of the first switch 12 is switched to a fixed terminal 12b side by a line selection signal 17 output from the non-voice signal detector 11, so the input signal 14 is directly transmitted to the voice decoding unit 20 through a line 32 as the output transmission data 16 at a transfer rate of 64 kbits/s.

On the other hand, when the non-voice signal detector 11 detects that the input signal 14 is a voice signal, the movable terminal 12a of the first switch 12 is switched to the fixed terminal 12c side, so the data encoded by the voice encoder 113 on the basis of the low bit rate voice encoding scheme at 16-kbits/s is transmitted to the voice decoding unit 20 through the line 33 as the output transmission data 15.

On the other hand, when the input signal 14 is detected by the non-voice signal detector 11 as a voice signal, the movable terminal 12a of the first switch 12 is switched to the fixed terminal 12c side. The voice data encoded by the voice encoder 113 at 16 kbits/s with high efficiency is transmitted to the voice decoding unit 20 through the line 33 as the output transmission data 15.

On the voice decoding unit 20 side, when a line selection signal 26 corresponding to the line selection signal 17 represents that the transmitted signal is input from the line 32 as input data 25 at a transfer rate of 16 kbits/s, a movable terminal 21a of a second switch 21 is connected to a fixed terminal 21c side. The input transmission data 24 encoded by low bit rate voice encoding at 16 kbits/s is decoded by the voice decoder 122 based on ITU-TG.728 and output through the second switch 21 as an output signal 23.

When the signal is transmitted through the line 32 as the input transmission data 25, the movable terminal 21a of the second switch 21 is switched to the fixed terminal 21b side by the line selection signal 26, so the input transmission data 25 at a transfer rate of 64 kbits/s in the telephone band is output through the second switch 21 as the output signal 23.

According to the second embodiment, since the line at 64 kbits/s is used to transmit a modulated/demodulated signal, a line having an originally assumed quality allowing transmission most appropriate to the modulation/demodulation scheme, and connected for data transmission can be provided. More specifically, the modulation/demodulation unit used for data transmission is expected to be used for voice line connection. Such a modulation/demodulation unit is developed originally assuming that it is connected to a 64-kbit/s linear line in the telephone band. In the present invention, the 64-kbit/s line is used for a modulated/demodulated signal. For this reason, a line assuming the original quality of the modulation/demodulation scheme is provided to allow and most ideal and proper coping.

Figure 4:
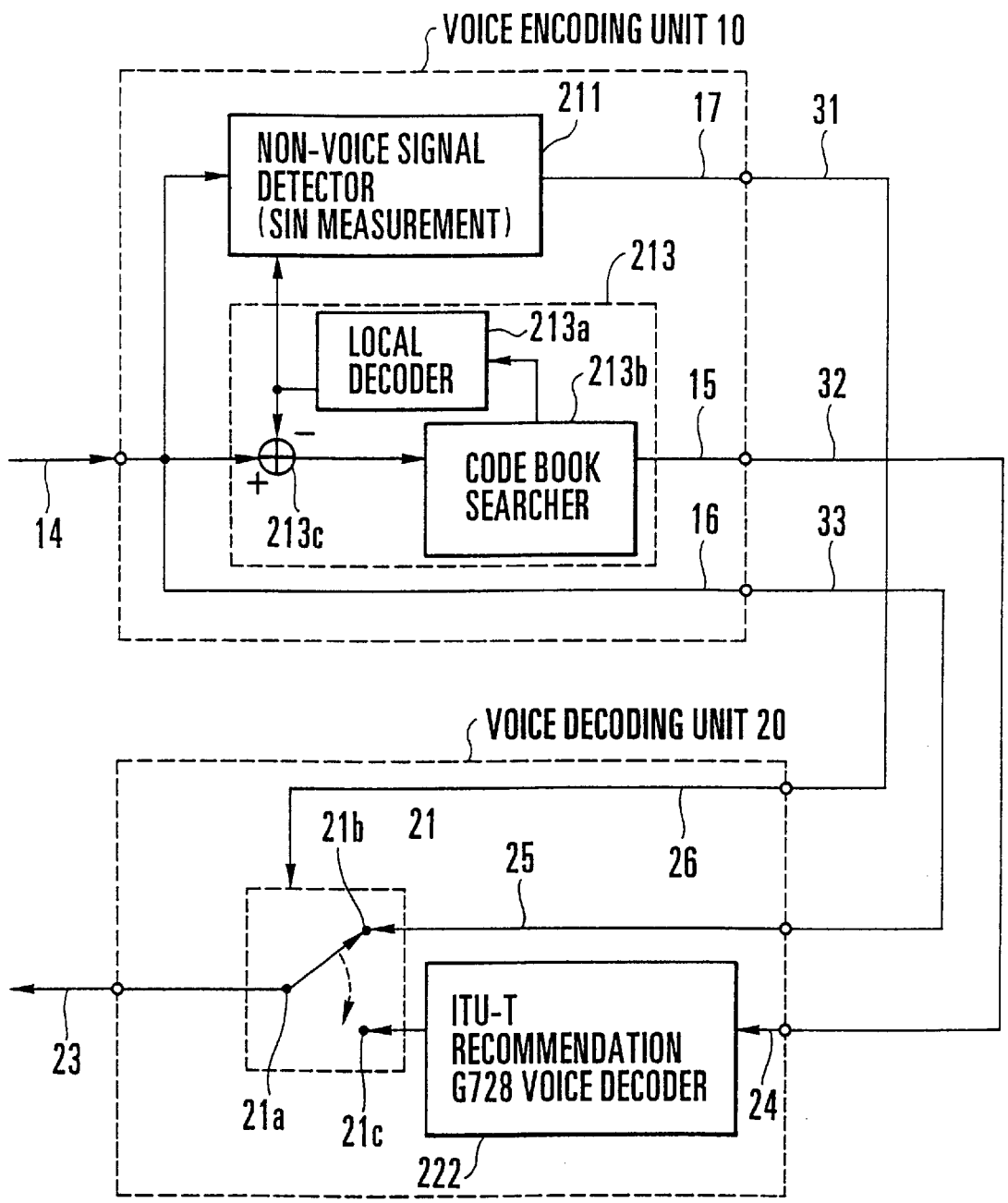
FIG. 4 is a block diagram showing a voice encoding/decoding apparatus coping with a modem signal according to the third embodiment of the present invention.

FIG. 4 shows a voice encoding/decoding apparatus according to the third embodiment of the present invention. The same reference numerals as in FIGS. 1 and 3 denote the same parts in FIG. 4, and a detailed description thereof will be omitted.

In this embodiment, a voice encoder 213 realizes specific voice encoding using the ITU-T recommendation G.728 scheme. The voice encoder 213 comprises a local decoder 213a for decoding a predetermined voice signal code in accordance with an input signal, a code book searcher 213b for searching for a code which has been prepared in advance in accordance with the subtracted voice signal and outputting it to the local decoder 213a, and a subtractor 213c for receiving a subtracted voice signal and subtracting the output from the local decoder 213a from an input signal 14 and outputting the result to the code book searcher 213b.

A non-voice signal detector 211 measures the S/N ratio of the output from the local decoder 213a of the voice encoder 213 to the input signal 14. A signal having an S/N ratio with a predetermined value or less is determined as a non-voice signal, thereby detecting a non-voice signal.

According to the ITU-T recommendation G.728 voice encoding, the threshold value of the S/N ratio used to determine a voice signal and a non-voice signal can be set in advance with reference to the effective value of the S/N ratio in encoding a normal voice input.

This method of determining a voice signal and a non-voice signal uses the nature that since low-bit-rate voice encoding such as the ITU-T recommendation G.728 voice encoding is optimized to obtain a low bit rate and high voice quality, its characteristics degrade for a non-voice signal.

In the non-voice signal detector 211 for measuring the S/N ratio, the degradation in characteristics is measured on the basis of the S/N ratio to measure a non-voice signal. More specifically, the S/N ratio of the output from the local decoder 213a to the input signal 14 is measured to switch between use and nonuse of the voice encoding and decoding units. Hence, use of the non-voice signal detector 211 for receiving the output signal from the local decoder 213a in the voice encoder 213 preferentially aims at detection of a non-voice signal. Even when the encoded voice quality degrades by a predetermined level or more due to the background noise or characteristics of the input voice signal, a 64-kbit/s line is selected as in reception of a non-voice signal.

Even when a voice signal having characteristics inconvenient to the voice encoding scheme is input, and a certain voice quality cannot be ensured, a voice quality to some degree can be guaranteed by the above operation using the 64-kbit/s linear line without unsatisfactory voice encoding.

As has been described above, according to the present invention, the voice encoding/decoding apparatus can cope with signals of all modulation schemes, which can be determined as non-voice signals, and a line connected for data transmission and capable of most proper transmission corresponding to the modulation/demodulation scheme can be provided.

In addition, since only detection of a modulated/demodulated signal is performed, and no modulator or demodulator need not be incorporated, the apparatus can be made compact and simplified, and the power consumption can be reduced. Furthermore, the transfer rate capability can be maximized.

What is claimed is:

1. An apparatus for distinguishing between a voice signal and a non-voice signal prior to transmission comprising:
   a voice encoding unit for encoding a voice signal and a voice decoding unit for decoding the encoded voice signal transmitted from said voice encoding unit,
   said voice encoding unit comprising:
      signal detection means for detecting whether an input signal is a voice signal or a non-voice signal and outputting a signal identification signal on the basis of the detection result; and
      voice encoding means for, when said signal detection means detects a voice signal, encoding the input signal as the voice signal and transmitting encoded data to said voice decoding unit,
      wherein when said signal detection means detects a non-voice signal, said voice encoding unit transmits the input signal directly to said voice decoding unit as non-encoded transmission data thus bypassing said voice encoding means; and
   said voice decoding unit comprising;
      voice decoding means for, when said signal detection means detects the voice signal, decoding the encoded data transmitted from said voice encoding means and outputting the decoded voice signal, and
      first switching means for selecting, on the basis of the signal identification signal output from said signal detection means, one of the decoded voice signal output from said voice decoding means and the non-encoded transmission data transmitted from said voice encoding unit.

2. An apparatus according to claim 1, wherein
   said voice encoding unit comprises second switching means for, when the signal identification signal output from said signal detection means represents detection of the voice signal, outputting the input signal to said voice encoding means, and when the signal identification signal represents detection of the non-voice signal, directly transmitting the input signal to said voice decoding unit.

3. An apparatus according to claim 1, wherein said voice encoding means comprises:
   a code book searcher for searching for a predetermined voice signal code in accordance with the input signal,
   a decoder for decoding the code output from said code book searcher, and
   a subtractor for subtracting the output from said decoder from the input signal and outputting the result to said code book searcher.

4. An apparatus according to claim 3, wherein
   said signal detection heans measures signal-to-noise (S/N) ratio of the output from said decoder to the input signal and determines that the input signal is a non-voice signal when the measured S/N ratio has a value not more than a predetermined value.

5. An apparatus according to claim 4, wherein
   said signal detection means sets a threshold value of the S/N ratio used to determine the input signal in advance with reference to an effective value of an S/N ratio in encoding a normal voice input using the ITU-T (International Telecommunication Union-Telecommunication sector) recommendation G.728 voice encoding scheme.

6. An apparatus according to claim 1, wherein
   said signal detection means outputs, as the signal identification signal, a line selection signal for selecting one of a line for transmitting the encoded voice signal upon detecting the voice signal and a line for transmitting the non-encoded transmission data upon detecting the non-voice signal.

7. An apparatus according to claim 6, wherein
   the encoded voice signal, non-encoded data, and line selection signal are multiplexed into a frame format and transmitted from said voice encoding unit to said voice decoding unit.

8. An apparatus according to claim 7, wherein
   even when a plurality of voice encoding units and voice decoding units are combined, and each voice encoding unit and voice decoding unit select transfer rates according to the input signals, an output signal in a predetermined multiplex frame format is transmitted through an output line at a specific transfer rate in the entire voice encoding unit.

9. An apparatus according to claim 7, wherein
   said voice decoding unit extracts, from the multiplexed and transmitted encoded voice signal, non-encoded data, and line selection signal, the line selection signal, input transmission data corresponding to the encoded voice signal, and input transmission data corresponding to the non-encoded data by a procedure inverse to that on said voice encoding unit side.

10. An apparatus according to claim 1, wherein
    said voice encoding unit changes a transfer rate of output transmission data between detection of the voice signal and detection of the non-voice signal.

11. An apparatus according to claim 10, wherein
    the output transmission data is transmitted at a transfer rate of 16 kbits/s when the voice signal is detected and at a transfer rate of 64 kbits/s when the non-voice signal is detected.

12. An apparatus according to claim 1, wherein
    said voice encoding unit transmits output transmission data at two transfer rates corresponding to a non-compressed voice signal and a compressed voice signal.

13. An apparatus according to claim 1, wherein
    said signal detection means detects a frequency distribution of the input signal and measures a power of a specific frequency to identify the voice signal and the non-voice signal.

14. An apparatus according to claim 1, wherein
    said signal detection means identifies a difference between the voice signal and the non-voice signal using a neurocomputer which learns a difference between a voice signal associated with a power distribution of a frequency band of the input signal and a modulated data communication signal.

* * * * *